United States Patent [19]
Chen

[11] Patent Number: 4,871,141
[45] Date of Patent: Oct. 3, 1989

[54] ADJUSTABLE UMBRELLA SUPPORT

[76] Inventor: David Chen, No. 17, Pai Sha Road, Chien Hsi Li, Shin Chu City, Taiwan

[21] Appl. No.: 756,180

[22] Filed: Jul. 18, 1985

[51] Int. Cl.$^4$ ............................................ F16M 13/00
[52] U.S. Cl. ..................................... 248/534; 248/230; 248/231.8; 297/184
[58] Field of Search .............. 248/534, 538, 539, 540, 248/541, 231-238, 316.7, 230; 297/184, 188, 194

[56] References Cited

U.S. PATENT DOCUMENTS

| | | | |
|---|---|---|---|
| D. 237,941 | 12/1975 | Dotter | 248/539 X |
| 521,355 | 6/1894 | Yapp | 248/540 |
| 1,003,285 | 9/1911 | Miller | 248/539 |
| 2,216,886 | 10/1940 | Langelier | 248/231.8 X |
| 3,304,035 | 2/1967 | Davis | 248/541 X |
| 3,586,276 | 6/1971 | O'Mahoney | 297/194 X |
| 3,848,838 | 11/1974 | Thomas | 248/541 |

FOREIGN PATENT DOCUMENTS 763188 4/1934 France .................................. 248/229
884479 12/1961 United Kingdom ............. 248/316.7

Primary Examiner—Ramon S. Britts
Assistant Examiner—David L. Talbott
Attorney, Agent, or Firm—Robert B. Frailey

[57] ABSTRACT

This invention is related to an improved adjustable support for an umbrella which consists of a fixing seat and two flexible components. Along the fixing seat there is a longitudinal opening, and semi-ball protuberances are provided around the inner surface of the fixing seat. The opening and the semi-ball protuberances are used to allow the fixing seat to be securely clamped on one side of the beach chair. At the fixing seat, it is also provided with a deep hole for the insertion of a umbrella central rod, and two flexible components are provided on each of the upper and lower parts of the umbrella central rod respectively. These two flexible components are used for angle adjustment of the umbrella in accordance with the direction of sunlight. It is, therefore, a simple structure, easy to use, and practical creation.

5 Claims, 4 Drawing Sheets

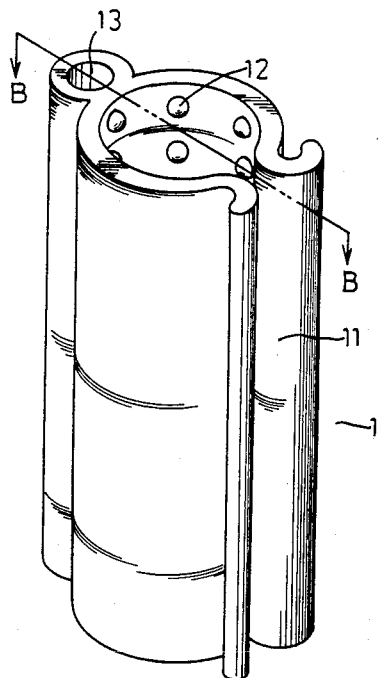
F I G.1-A
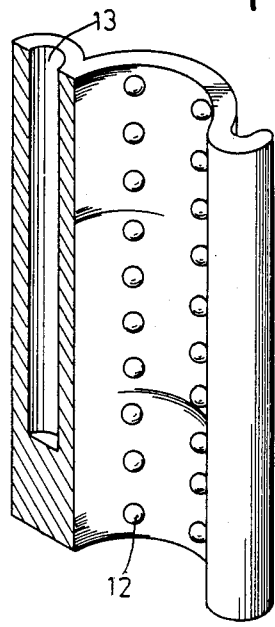
F I G.1-B

ADJUSTABLE UMBRELLA SUPPORT

BACKGROUND OF THE INVENTION

An improved support for umbrella, which especially can be clamped on one side of the beach chair to provide sunlight shielding function, and it is also applicable to chairs located in beach side, swimming pool side, and balcony.

During summer time recreation, people are always bothered by endless sweating which comes from either direct exposure to sunlight or hot and humid air. A place full of breeze and green shade are always welcomed by people, but in summer time it is hard to find a green shade on beach side nor on balcony. Therefore, various sun shielding umbrellas with large shielding area were invented to be widely used on beach side, swimming pool side, and balcony.

As shown in FIG. 4, the conventional umbrella clamp comprises a c-clamp (4), a bolt (5), and a fixing screw (6) to allow the umbrella to be fixed on the arm rest of a beach chair. However, this conventional umbrella clamp has inherently some defects:

1. High Cost: Because c-clamp (4), bolt (5) and fixing screw (6) are all made of metal the cost thereof is increased.
2. Inconvenience: when it is assembled to a chair or disassembled from a chair, it needs to tighten not only the bolt (5) but also the fixing screw (6).
3. Hard to be fixed: due to the slippery of the arm rest of a beach chair, the c-clamp (4) is hard to be fixed thereon.
4. Distory the arm rest function of a beach chair: because umbrella clamp is fixed on one of the arm rest of beach chair, it prevents the sitter from putting one of his arms on one of the arm rests.

It is, therefore, an object of the present invention to obviate and mitigate the above-noted drawbacks.

SUMMARY OF THE INVENTION

The purpose of this invention is to provide an improved support for an umbrella which includes a hollow, self-cleaning fixing seat and two flexible components. At the fixing seat there is a opening by which said fixing seat can be directly clamped on one side of a beach chair. The fixing seat is also provided with a deep hole for the insertion of the central rod of an umbrella. At the upper and lower portions of the central rod there are provided flexible components respectively which are used for adjusting the angle of the umbrella in accordance with the direction of sunlight in order to obtain sunlight shielding function.

BRIEF DESCRIPTION OF THE DRAWINGS

For the purpose of easy understanding the structure, feature, application, effectiveness of the present invention, it is described in detail with the accompanying drawings, wherein FIG. 1A is a local perspective view of the invention;

FIG. 1B is the cut-away view along line B—B of FIG. 1A;

DETAILED DESCRIPTION OF THE PREFERRED EMBODIMENT

Figure 2:
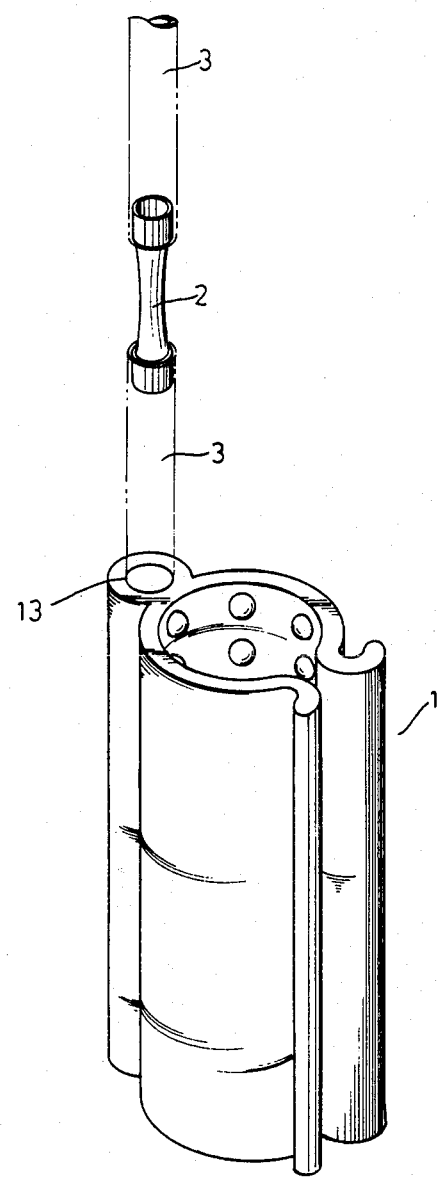
FIG. 2 is a perspective view of the invention.

Referring to FIGS. 1A and 1B, 2 and 3, it can be seen that the present invention consists of a tubular fixing seat (1) and two flexible components (2). The fixing seat (1) is made of durable and tough plastic. In order to allow the hollow fixing seat to be easily clipped on one side of the beach chair, it is provided with a longitudinal opening (11) along its long axis as well as semi-ball protuberances (12) around its inner surface. At the fixing seat (1) there is also a hole (13). Flexible components (2) are made of flexible plastic materials, and umbrella central rod (3) is connected to one of the two ends of each flexible component (2).

In its preferred form, the fixing seat (1) is a one-piece, C-shaped, spring type clip which is adapted to be snapped or clipped onto a tubular element, such as the tubular frame of a beach chair. Preferably, the flexible components (2) are disposed in, and constitute part of, the umbrella rod (3).

Figure 3:
FIG. 3 is the application diagram of the invention.
Figure 4:
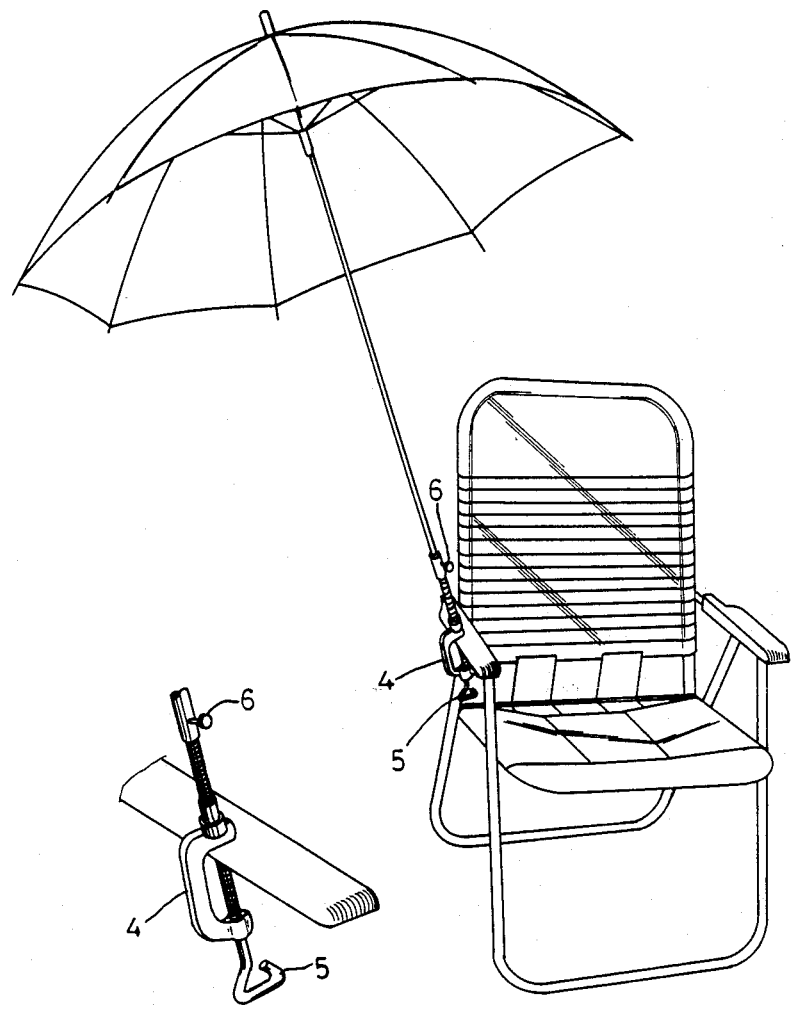
FIG. 4 is the application diagram of a conventional umbrella fixing clamp.

In use, as shown in FIG. 3, the fixing seat (1) is directly clamped on one side of the beach chair by its opening (11) and semi-spherical protuberances (12) thereof, then umbrella central rod (3) is inserted into the hole (13) of the fixing seat (1). Furthermore, there are two flexible components (2) provided in the upper and lower portions of the umbrella central rod (3) respectively. These flexible components (2) are used for adjusting the angle of the umbrella in accordance with the direction of sunlight for the provision of proper sun shielding function.

As compared with the conventional umbrella clamp, the present invention possesses the following advantages:

(1) Because this invention is made of plastic material, it is cheaper than the conventional one. Furthermore, the fixing seat thereof, being self-clamping, can be directly forced or clipped on one side of the beach chair, and procedures for tightening bolt and fixing screw are eliminated as it should be done on a conventional umbrella clamp. In addition, the bending angle of the flexible component thereof is more reactive than the conventional one.

(2) The fixing seat of this invention is clipped on one side of the beach chair, therefore, it will not destroy the function of the arm rest of the beach chair.

(3) It is easy for this invention to be clipped on or taken off, thus procedures for tightening the bolt and fixing screw are eliminated, furthermore, this invention is rustless and practical for use.

(4) This invention can be clipped on chairs of any size as well as it can be clipped on any tubular objects.

I claim:

1. An adjustable umbrella support comprising
   (a) a tubular fixing seat having a narrow, longitudinally extending, opening for clipping the fixing seat to a chair,
   (b) a plurality of protuberances disposed internally of the fixing seat,
   (c) a hole disposed in the fixing seat for reception of an umbrella rod,
   (d) an umbrella rod and
   (e) at least one flexible component connected to the umbrella rod for selected adjustment of the umbrella.

2. An adjustable umbrella supporting according to claim 1, wherein the fixing seat comprises a self-clamping, one-piece element composed of plastic.

3. An adjustable umbrella support according to claim 1, wherein the protuberances are of semi-spherical configuration.

4. An adjustable umbrella support comprising
   (a) a hollow, C-shaped, one-piece, self-clamping fixing seat having a longitudinal opening communicating with the fixing seat hollow for clipping the fixing seat to a tubular object,
   (b) a plurality of protuberances disposed within the hollow of the fixing seat for securely clamping the fixing seat to the tubular object,
   (c) a hole disposed in the fixing seat for reception of an umbrella rod,
   (d) an umbrella rod disposed in the hole and
   (e) at least one flexible component disposed in the umbrella rod for selected adjustment of the umbrella.

5. An adjustable umbrella support according to claim 4, wherein the fixing seat comprises a non-metallic, spring type element.

* * * * *

UNITED STATES PATENT OFFICE
CERTIFICATE OF CORRECTION

PATENT NO. : 4,871,141
DATED : October 3, 1989
INVENTOR(S) : David Chen

It is certified that error appears in the above-identified patent and that said Letters Patent is hereby corrected as shown below:

ABSTRACT

Line 2,   before "fixing" insert --hollow, self-clamping--

CLAIMS

Claim 2

Column 3, line 1,   change "supporting" to --support--

Signed and Sealed this

Thirtieth Day of October, 1990

Attest:

HARRY F. MANBECK, JR.

*Attesting Officer*        *Commissioner of Patents and Trademarks*